(12) United States Patent
Cohen (10) Patent No.: US 10,036,934 B2
(45) Date of Patent: Jul. 31, 2018

(54) LASER SYSTEM

(71) Applicant: OCUWAVE LTD., Ramat-Gan (IL)

(72) Inventor: Nissim Cohen, Ramat-Gan (IL)

(73) Assignee: OCUWAVE LTD., Ramat Gan (IL)

( * ) Notice: Subject to any disclaimer, the term of this patent is extended or adjusted under 35 U.S.C. 154(b) by 0 days.

(21) Appl. No.: 15/533,275

(22) PCT Filed: Dec. 13, 2015

(86) PCT No.: PCT/IL2015/051204
§ 371 (c)(1),
(2) Date: Jun. 5, 2017

(87) PCT Pub. No.: WO2016/098100
PCT Pub. Date: Jun. 23, 2016

(65) Prior Publication Data
US 2017/0353000 A1      Dec. 7, 2017

(30) Foreign Application Priority Data

Dec. 18, 2014   (IL) .......................................... 236339

(51) Int. Cl.
| | |
|---|---|
| *G02F 1/35* | (2006.01) |
| *H01S 3/07* | (2006.01) |
| *H01S 3/00* | (2006.01) |
| *H01S 3/109* | (2006.01) |
| *H01S 3/08* | (2006.01) |
| *H01S 3/067* | (2006.01) |
| *H01S 3/082* | (2006.01) |
| *H01S 3/16* | (2006.01) |
| *G02F 1/37* | (2006.01) |

(52) U.S. Cl.
CPC ............ *G02F 1/353* (2013.01); *G02F 1/3501* (2013.01); *G02F 1/37* (2013.01); *H01S 3/0092* (2013.01); *H01S 3/06708* (2013.01); *H01S 3/07* (2013.01); *H01S 3/082* (2013.01); *H01S 3/08086* (2013.01); *H01S 3/08095* (2013.01); *H01S 3/109* (2013.01); *H01S 3/1611* (2013.01); *H01S 3/1618* (2013.01)

(58) Field of Classification Search
CPC .......... G02F 1/3501; G02F 1/353; G02F 1/37; H01S 3/0092; H01S 3/07; H01S 3/08086; H01S 3/109; H01S 3/1611; H01S 3/1618
See application file for complete search history.

(56) References Cited

U.S. PATENT DOCUMENTS 4,660,205 A    4/1987   Harter et al.
4,956,843 A *  9/1990   Akhavan-Leilabady ..................
                                                    H01S 3/09415
                                                           372/23

(Continued)

OTHER PUBLICATIONS

International Search Report for International Application No. PCT/IL2015/051204 dated Mar. 21, 2016.

*Primary Examiner* — Daniel Petkovsek
(74) *Attorney, Agent, or Firm* — Dorsey & Whitney LLP (57) ABSTRACT

A laser system is described, the laser system comprising: an optical cavity defined by at least first and second at least partially reflecting elements; and a gain system. The gain system comprising at least first and second gain media located within the optical cavity. The first and second gain media are configured to generate optical radiation of at least first and second wavelength ranges in response to pumping energy.

22 Claims, 3 Drawing Sheets

(56) References Cited

U.S. PATENT DOCUMENTS

| | | | | |
|---|---|---|---|---|
| 5,627,849 | A * | 5/1997 | Baer | H01S 3/109 |
| | | | | 372/19 |
| 5,761,227 | A * | 6/1998 | Hargis | H01S 3/042 |
| | | | | 372/22 |
| 5,802,086 | A * | 9/1998 | Hargis | H01S 3/108 |
| | | | | 372/22 |
| 5,912,912 | A * | 6/1999 | Caprara | H01S 3/07 |
| | | | | 372/101 |
| 5,949,802 | A * | 9/1999 | MacKinnon | H01S 3/109 |
| | | | | 372/105 |
| 7,187,703 | B2 * | 3/2007 | Kadoya | H01S 3/07 |
| | | | | 372/70 |
| 7,792,162 | B2 * | 9/2010 | Piper | H01S 3/1086 |
| | | | | 372/20 |
| 8,345,717 | B2 * | 1/2013 | Dekker | H01S 3/1086 |
| | | | | 372/20 |
| 8,351,108 | B2 * | 1/2013 | Mizushima | H01S 3/0612 |
| | | | | 359/328 |
| 9,366,939 | B2 * | 6/2016 | Xie | G02F 1/39 |
| 2006/0126674 | A1 | 6/2006 | Sun et al. | |
| 2007/0297481 | A1 | 12/2007 | Adachi | |
| 2008/0192782 | A1 | 8/2008 | Georges | |
| 2010/0309438 | A1 * | 12/2010 | Mizushima | H01S 3/109 |
| | | | | 353/31 |

* cited by examiner

LASER SYSTEM

TECHNOLOGICAL FIELD

This invention is in the field of laser systems and relates in particular to laser systems having two or more modes of emission.

BACKGROUND

Laser systems are known to provide optical emission with desired properties. This is achieved using optical emission and amplification utilizing a gain material having electronic states of suitable energetic relations.

Various types of laser systems differ in gain materials, optical cavity characteristics as well as in additional manipulation performed on the emitted light. This includes the use of solid state gain materials (e.g. appropriately dopes semiconductor, glass, crystal, ceramic or other materials), gaseous gain materials or various other gain media type. Generally, selection of the gain medium for use within a laser system provides a usable wavelength range of the system. The usable wavelength range is determined in accordance with an appropriate energy gap between the electronic states of the gain medium used in operation of the laser system. Such energy gap may also be affected from physical state of the gain material, thus a gas based laser system has generally narrow wavelength range while solid state based laser system may provide wavelength tunability along a wider wavelength range.

GENERAL DESCRIPTION

There is a need in the art for a novel configuration of laser systems. As indicated above, the selection of gain medium dictates a usable wavelength range, providing no or limited tuning within the range. Thus, designing a laser system configured to emit at a desired wavelength requires prior selection of a suitable gain medium with the appropriate emission properties. Additionally, the emitted wavelength can be tailored using non-linear effects such as Second Harmonic Generation (SHG) or higher harmonic generation, Sum or difference wavelength etc.

The present invention provides a novel laser system configuration allowing greater selection in wavelength and/or mode of emitted light. To this end, the laser system includes an optical cavity defined by at least first and second at least partially reflecting elements (e.g. reflecting surfaces and/or Volume Bragg Grating (VBG)) and at least first and second gain media located within the optical cavity. The at least first and second gain media are configured to generate optical radiation of at least first and second wavelength ranges respectively in response to pumping energy. The use of first and second wavelength ranges of the emitted radiation allows higher selection and tailoring options of the output wavelength of the laser system.

Alternatively or additionally, the laser system includes a gain unit (comprising one or more gain media) and at least one optical cavity. The laser system comprises additional optical elements configured to support at least two different optical paths for light emitted by the gain unit. Generally one of the at least two optical paths includes light oscillations within the optical cavity. A second optical path may be oscillation within a second optical cavity (i.e. a second arm of the laser system) or light passage through the laser system in an optical/laser amplifier structure. In this configuration, the laser system provides a gain unit and main and auxiliary arms of the laser system and configured to support selective light emitting through the main and/or the auxiliary arms in two or more different optical modes. Such optical modes may be spatial modes, temporal modes (pulsed or CW emission), wavelength modes and/or operation as laser and amplifier modes. It should be noted that the term temporal mode as used herein below refers to time behavior of the emitted optical radiation. Generally a continuous wave (CW) radiation differs from pulsed radiation by the temporal behavior of the radiation, and similarly pulsed radiations at different pulse lengths and/or frequency.

It should be noted that the term optical cavity as used herein refers to linear optical cavity including reflecting elements as well as to any other type of optical cavity such as ring shaped cavity etc.

The first and second gain media may be separate gain units or occupy different regions of a single gain unit. Additionally the at least first and second gain media may be arranged together in the same region, e.g. crystalline gain unit doped with two or more different gain materials. The gain media may generally be successively arranged along the longitudinal axis of the cavity and each of the gain media is configured to emit optical radiation of the corresponding wavelength range into the optical cavity in response to suitable pumping. It should be noted that the optical cavity is generally designed to support at least the first and second wavelength ranges, and in some configurations, at least one additional wavelength range determined is accordance with the first and second wavelength ranges. This is to allow suitable amplification and operation of the laser system with the desired output optical emission.

The laser system may also comprise a wavelength conversion unit, which may be located within the optical cavity or outside of the optical cavity in optical path of emitted light. The wavelength conversion unit is generally configured to generate interaction of the emitted light resulting in generation and emission of light of at least a third wavelength range. The wavelength conversion unit may be configured to provide nonlinear interaction between optical radiation of selected wavelength ranges (generally the first and second wavelength ranges) to thereby generate radiation of said at least a third, possibly new, wavelength range, and possibly one or more additional wavelength ranges. The nonlinear interaction may be a result of parametric or nonparametric processes and may be any one of the following: wave mixing, sum wavelength mixing, difference wavelength mixing, three wavelength mixing, four wavelength mixing, high order wavelength mixing, or any other desired wavelength mixing. Additionally or alternatively, the wavelength conversion unit may be configured as an optical parametric oscillator (OPO), intra-cavity OPO (IOPO) or an optical parametric amplifier (OPA) to provide tunable output wavelength. In an intra-cavity OPO (IC-OPO), the nonlinear crystal is situated inside the cavity of the pump laser, allowing the large circulating laser field to be accessed and hence reducing the external pump threshold. According to some embodiments, the conversion unit may be configured to utilize Raman wavelength conversion.

In some configurations, the laser system may comprise an intra-cavity beam splitting unit and a third at least partially reflective element. The beam splitting unit is configured to direct at least a portion of light of the at least first and/or second wavelengths, and possibly the at least third wavelength, towards the third at least partially reflective element. This configuration generates an auxiliary arm of the optical cavity providing a second output for optical radiation of from the laser system. It should be noted that the second output may be configured for outputting optical radiation of at least one wavelength range which may be any one of the first or second wavelengths, the third wavelength, a combination thereof and included additional wavelength if any.

Generally the auxiliary arm may be configured to provide output radiation different than that of the main arm of the laser system. The auxiliary arm and the associated third at least partially reflecting element may provide output of a different wavelength (first or second with respect to third from the main arm), a different spatial mode and/or a different temporal mode (pulsed, CW operation). In some configurations, the auxiliary arm may comprise a Q-switch or a saturable absorber to thereby provide pulsed radiation output. Additionally or alternatively, the auxiliary arm may comprise an additional wavelength conversion unit configured to generate at least one fourth wavelength, e.g. doubling frequency of said first or second wavelength ranges utilizing a linear or non-linear wave interaction. It should be noted that the output of the auxiliary arm may be of any one of the supported wavelength ranges and/or a combination of one or more of the supported wavelength ranges.

In some configurations, the laser system of the present invention may be configured such that the main arm thereof operates as an optical cavity to provide laser radiation. This is while the auxiliary arm is configured for operation as a laser amplifier, i.e. for amplification of input laser radiation. To this end the auxiliary arm may be configured for receiving input optical radiation of a predetermined wavelength range, and direct the received optical radiation to pass through the gain unit (comprising one or more gain media elements). Passage of the input optical radiation through the appropriate gain medium cause stimulated emission of optical radiation and provide amplification to the input radiation. The amplified optical radiation may than be output of the laser system via the auxiliary output.

Thus, according to one broad aspect of the invention, there is provided a laser system comprising: an optical cavity defined by at least first and second at least partially reflecting elements; and a gain system comprising at least first and second gain media located within said optical cavity, the first and second gain media being configured to generate optical radiation of at least first and second wavelength ranges in response to pumping energy.

The laser system may further comprise a wavelength conversion unit configured for generating appropriate interaction of light of said at least first or and second wavelength ranges to thereby generate light of at least a third wavelength range. The wavelength conversion unit may be an intra-cavity conversion unit or an extra-cavity conversion unit.

The wavelength conversion unit may be configured to provide nonlinear wavelength conversion in response to optical radiation of said at least first or and second wavelength ranges. The nonlinear wavelength conversion may comprise at least one of the following: harmonic generation, wave mixing, sum wavelength mixing, difference wavelength mixing, three-wave mixing, four wavelength mixing, high order wavelength mixing, optical parametric oscillator (OPO), optical parametric amplifier (OPA). Additionally or alternatively the wavelength conversion unit may be configured to provide nonlinear wavelength conversion in response to optical radiation of said at least first or and second wavelength ranges, said nonlinear wavelength conversion comprises at least Raman wavelength conversion.

According to some embodiments, the at least first and second gain media may be in the form of solid material comprising gain material. The first and second gain media may have at least one of the following configurations: the at least first and second gain media being in the form of first and second doping material of a single solid material; the at least first and second gain media being in the form of first and second element fused together at an interface thereof; the at least first and second gain media being in the form of spaced-apart first and second gain elements.

The at least first and second gain media may be in the form of first and second solid elements fused together by diffusion bonding at an interface thereof; first and second optical fibers being spliced together; and/or arranged in a single gain element such that particles of said first and second gain media are mixed together within a region of said gain element.

According to some embodiments, the said pumping energy may comprise optical, chemical and/or electrical pumping of at least one wavelength range.

The laser system may comprise at least one intra-cavity output coupler configured to allow at least a portion of light impinging thereon to be transmitted out of said optical cavity. Generally, the laser system may be configured in a bended form of the optical cavity providing a V or Z shaped optical cavity or comprise a ring shaped optical cavity.

According to some embodiments, the laser system may be configured to provide continuous wave radiation in said at least third wavelength range. Alternatively, it may be configured to provide pulsed radiation in said third wavelength range. For example, utilizing a Q-switch mechanism located within the optical cavity and configured to generate pulsed radiation in said third wavelength range. In some other configuration, the laser system may utilize a mode-lock mechanism located within the optical cavity and configured to generate pulsed radiation in said third wavelength range.

According to some other embodiments, the laser system may comprise a mode-lock mechanism located within the optical cavity and configured to generate pulsed radiation having bandwidth determined by a combination of the first and second wavelength ranges.

In some embodiments, the laser system may comprise an intra-cavity beam splitting unit and a third at least partially reflective element, the beam splitting unit is configured to direct at least a portion of emitted light towards the third at least partially reflective element thereby generating an auxiliary arm of said optical cavity to thereby provide an auxiliary output coupler. The auxiliary arm of the optical cavity may comprise a pulsating mechanism configured to generate pulsed optical radiation of a selected wavelength ranges. Additionally or alternatively said auxiliary arm of the optical cavity may comprise an auxiliary wavelength conversion unit configured for generating of at least a fourth wavelength in response to optical radiation of at least one of the first and second wavelength.

The auxiliary arm may be configured to provide optical emission of a selected operation mode being different with respect to operation mode of optical radiation emitted by an output coupler of a main arm of the optical cavity. The selected operation mode may be defined by at least one of the following: temporal mode, spatial mode and wavelength range.

The laser system may be configured such that the gain system comprises a solid element and wherein a first region thereof being doped the first gain medium and a second region thereof being doped with a second gain medium. The first gain medium may be Neodymium and the second gain medium is Ytterbium, said pumping energy being provided by optical radiation. The solid element may be YAG crystal.

At least one of the first and second at least partially reflecting elements may be configured with dielectric coating to reduce reflection of optical radiation in one or more selected wavelengths while maintaining reflection properties for optical radiation in one or more other selected wavelengths.

According to some embodiment, the first and second wavelength ranges comprise at least one of 1029 nm, 1319 nm and/or 1338 nm.

The laser system may be configured to provide output radiation of said third wavelength range being 578 nm and/or 582 nm.

According to some embodiments, at least one arm of the laser system may be configured to operate as a laser amplifier unit with respect to a selected wavelength range.

According to yet another broad aspect of the invention, there is provided a laser system comprising: a main optical cavity defined by first and second at least partially reflecting elements, a gain system comprising at least one gain medium, and a beam directing unit comprising a beam splitting unit and configured to selectively direct light within the first optical cavity or towards a second optical element thereby defining an auxiliary optical cavity; said laser system being configured to selectively operate said main and auxiliary optical cavities in at least two different modes of operation.

The main optical cavity may be configured for operating as a laser and said auxiliary optical cavity is configured to operate as a laser amplifier. The at least two different modes of operation may comprise operation in at least one of the following: two different spatial modes of emitted radiation; two different temporal modes of emitted radiation such temporal modes may comprise modes being different in at least one of the following: pulsating or CW radiation, length of pulsating radiation and frequency of pulsating radiation; and two different wavelength ranges.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
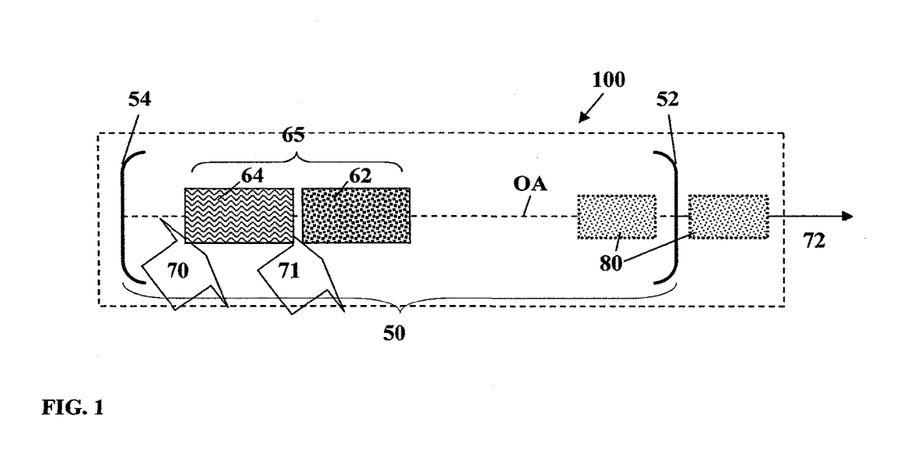
FIG. 1 illustrates a laser system according to some embodiments of the present invention.

Reference is made to FIG. 1 illustrating a laser system 100 according to some embodiments of the present invention. The laser system 100 includes at least first 52 and second 54 surfaces defining an optical cavity 50 between them, and a gain system 65 including at least first 62 and second 64 gain media located within the optical cavity. Each of the first 62 and second 64 gain media is selected and configured to emit optical radiation at respectively first and second wavelength ranges in response to suitable pumping energy 70 and 71, which may be electric and/or chemical and/or optical pumping of one or more wavelength ranges. The first and second surfaces 52 and 54 are configured to be at least partially reflecting to optical radiation of the first and second wavelength ranges to allow amplification of the corresponding emission. Generally the optical cavity 50 also includes an output coupler configured to transmit output radiation 72 out of the optical cavity 50. The output coupler may be at list one of the first and second surfaces 52 and 54, or a separated output coupler as will be described further below with reference to FIG. 4. Also shown in the figure is a wavelength conversion unit 80, which may or may not be used according to selected embodiments of the invention. The wavelength conversion unit 80 may be located within the optical cavity 50 or along optical path of light emitted out of the optical cavity 50 as will be described further below.

The first and second gain media 62 and 64 may be of any type gain media including but not limited to: appropriately doped crystal, glass or optical fiber; semiconductor element; suitable gas or a mixture of gasses; dye containing solid or liquid etc. however, the gain media are preferably of a similar type to simplify construction and operation of the laser system 100.

Generally, during operation of the laser system 100, each of the gain media 62 and 64 is exposed to suitable pumping energy 70 and/or 71 resulting in optical emission from the gain media. The optical cavity 50 is used to amplify emission along a preferred axis OA and generate a lasing effect. It should also be noted that the laser system may be used as laser amplifier system providing amplified optical emission in response to optical laser radiation. In this configuration pumping energy 70 may include both optical coherent or incoherent radiation as well as additional electrical or optical pumping energy. It should also be noted that such laser amplifier may provide amplification to at least one optical radiation of any desired wavelength range suitable with appropriate one or more energy gaps of any one of the gain media used. The amplification wavelength is generally determined based on the input coherent or incoherent radiation causing stimulated emission of the gain medium. When operating as a laser amplifier, the at least first and second surfaces (52 and 54 in this example) may be configured to direct the input radiation to pass through the gain medium several times before output from the system. This is different than standard optical cavity that generally provides repeating passage of the optical radiation through the gain media. It should be noted, and as will be described further below, the laser system of the present invention may provide a single gain unit while operating it through main and auxiliary arms in at least two different operation modes.

The laser system 100 may be operated by providing suitable pumping energy 70 and/or 71 to excite at least on of the first 62 and/or second 64 gain media. The pumping energy 70 and/or 71 may be optical pumping of one or more predetermined wavelength ranges and/or electrical pumping in accordance with the selection of the gain media. Generally a combined pumping, optical pumping for one gain medium and electrical pumping for one other gain medium may be used. Additionally, in embodiments where optical pumping is used, the pumping energy 70 may be provided with optical radiation of wavelength range being similar between the first and second gain media, or with two or more wavelength ranges selected. More specifically, the first 62 and second 64 gain media may be excited by optical pumping 70 and/or 71 of respectively first and second pumping wavelength, in accordance with properties of the gain media.

Upon proper excitation of the gain media, each or the first and second gain media emits optical radiation of respectively the first and second wavelength ranges. The emitted radiation is amplified by causing additional stimulated emission utilizing the properties of the optical cavity 50. It should be noted that the first and/or second gain media may be pumped and operated selectively. Thus the laser system may operate using only one of the gain media, and than operated in a different mode using the one other or both of the gain media. A portion of the optical radiation of the first and/or second wavelength ranges may be transmitted through the output coupler (e.g. partially reflecting element or surface 52) away from the optical cavity 50. Alternatively, in some embodiments utilizing an intra-cavity wavelength conversion unit 80, the optical radiation of the first and/or second wavelength ranges may be converted to optical radiation of at least a third wavelength range. In some configurations, the wavelength conversion unit 80 may generally be based on a nonlinear element configured to cause suitable nonlinear interaction between light of the first and/or second wavelength ranges. In some configurations, such nonlinear element may be selected to provide nonlinear interaction of light of one of the first and/or second wavelength with itself, e.g. to provide harmonic of the selected wavelength.

It should however be noted that the wavelength conversion unit 80 may also be located in optical path of light being output of the optical cavity 50. In such configuration, the output coupler is configured to transmit light of the first and/or second wavelength ranges, which path through the wavelength conversion unit and interact between them.

It should be noted, although not specifically shown here, that the use of extra-cavity wavelength conversion unit 80 may require pulsed operation of the laser system for emitting light of the first and/or second wavelength range, which will be described further below.

The wavelength conversion unit 80, being intra-cavity or extra-cavity, may generally be configured to provide nonlinear wavelength conversion in response to optical radiation of said at least first or and second wavelength ranges. For Example, the wavelength conversion unit may be a nonlinear crystal selected to generate at least one of the following nonlinear processes: wave mixing, sum wavelength mixing, second harmonic generation, THG, high order harmonic generation, difference wavelength mixing, three wave mixing, four wave mixing or high order mixing. Additionally or alternatively the wavelength conversion unit may utilize an optical parametric oscillator (OPO) or an optical parametric amplifier (OPA). Also, the wavelength conversion unit may utilize Raman wavelength conversion.

Also, the wavelength conversion unit 80 may be configured to provide several light interaction level to provide any desired wavelength. For example, the wavelength conversion unit 80 may be configured to output light after plurality of nonlinear chains of interactions including or not RAMAN type wavelength conversion.

The above mentioned processes are generally well known in the art and thus will not be described here in details, but to note the following. A wave mixing process involves with generation of optical radiation where the output frequency is a function of two or more frequencies of input radiation. In a sum wavelength mixing process, the output frequency is the sum of the frequencies of input radiation of two generally different wavelengths. Second Harmonic Generation (SGH) process is a private case where the input radiation is of a single wavelength and the output has double the frequency. Difference wavelength mixing is generation of light with a frequency that is the difference between two input frequencies. High order wavelength mixing generally describes a nonlinear process generating radiation of a frequency much higher then the input frequency. Four wave mixing generates radiation with frequency being the sum of four input frequencies. Optical parametric oscillator (OPO) or Intra-cavity OPO (IOPO) and optical parametric amplifier (OPA) utilize optical cavity to generate tunable output radiation of a frequency that is a function of one or more input radiation frequencies. Additionally the wavelength conversion unit may utilize stimulated RAMAN scattering medium thereby providing amplified RAMAN emission. It should also be noted that the wavelength conversion unit may be configured to integrate any of the above described techniques to provide the desired output emission.

Figure 2:
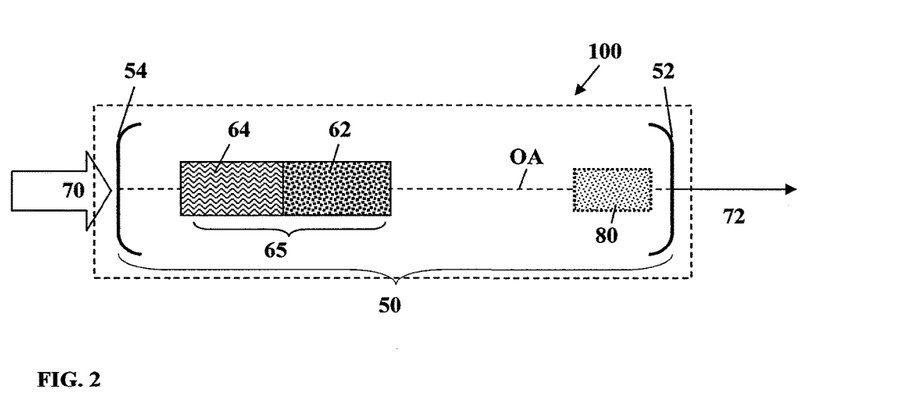
FIG. 2 illustrates a laser system according to some embodiments of the present invention utilizing solid state gain media.

Reference is now made to FIG. 2 illustrating a laser system 100 utilizing first 62 and second 64 gain media which are configured as crystal elements. As show, the first 62 and second 64 gain media of the gain system 65 are located in very close vicinity to each other, and in some embodiments are being attached to each other. Generally, the first 62 and second 62 gain media may be two different doping of a single element, or two separate elements interfacing each other. In this connection it should be note that the gain element may be of any solid matrix holding predetermined gain material. For example, the gain elements may be of crystal form, suitable doped semiconductor, optical fiber, glass etc. For example, the first and second gain media may be two rare-earth-ion doped crystals having respectively first and second doping, e.g. two crystals (such as YAG crystals) doped with Neodymium (Nd) and Ytterbium (Yb) respectively. The two crystals may interface each other and are preferably attached or fused together at the interface by diffusion bonding to provide optimized heat transfer and cooling of the gain media. Alternatively, a crystal may be used; having different regions of selected doping providing the at least first and second gain media is separated regions of the same crystal structure.

Additionally, although not specifically shown in the figure, the first and second gain media may be mixed together within a single region. More specifically, the first and second gain media may be first and second doping of a single crystal element, a ceramic crystal, a mixed fiber, semiconductor element or in some configurations to include first and second gas materials located in a single container. Such configuration of the gain media may provide increased heat transfer and overlap of the emitted radiation.

It should be noted that the laser system 100 as shown in FIGS. 1 and 2 may be operated in continuous wave (CW) mode. In such CW operation mode the laser system may be configured to output optical radiation of the first and/or second wavelength ranges, or to utilize and intra-cavity wavelength conversion unit 80 to provide output radiation of a third wavelength range. Generally however, the laser system 100 may be configured to provide pulsed output radiation.

Figure 3:
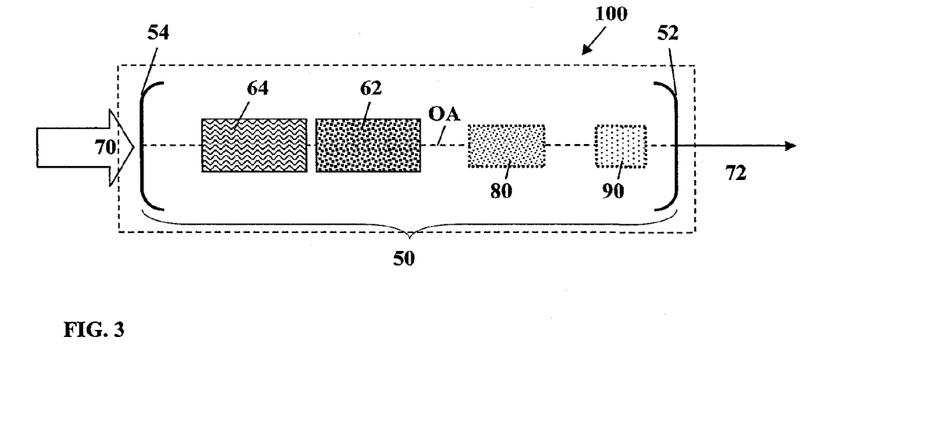
FIG. 3 illustrates a laser system configured for providing pulsed output radiation according to some embodiments of the present invention.

In this connection reference is made to FIG. 3 illustrating an additional example of the laser system 100 according to the present invention. The laser system 100 in this example is configured for providing pulsed optical radiation. In this exemplary embodiment, the laser system 100 includes an optical cavity 50 defined by first and second at least partially reflecting element 52 and 54; and at lease first and second gain media 62 and 64 placed within the optical cavity 50. The optical cavity also includes a wavelength conversion unit 80 configured to convert optical radiation of the first and/or second wavelength ranges into optical radiation of at least a third wavelength range, and a pulsing unit 90 configured to operate the laser system in a pulsed mode. To provide pulsed output laser radiation 72. As shown the first reflecting element 52 may be configured as an output coupler for light of the third wavelength range, while being configured to reflect most or at least a part of light of the first and/or second wavelength ranges within the optical cavity 50.

The pulsing unit 90 may be configured to cause optical radiation of the third wavelength range to be pulsating. Alternatively or additionally, it may be configured to cause pulsating radiation of one or both of the first and second wavelength ranges, preferably in overlapping pulsing sequence. In this connection, the pulsing unit 90 may utilize a Q-switch mechanism or mode-lock mechanism: saturable absorber, electro-optical (EO), acoustic-optical (AO) and/or mechanical switching, Kerr-lensing mechanism or any other mechanism for generating pulsed operation of the laser system as known in the art. For example, the use of saturable absorber may provide a mode-lock mechanism causing laser radiation in the form of switching pulse, or mode-lock wave-packets.

In such configuration of the laser system 100 as shown in FIG. 3, the first and second gain media may preferably be selected to have wide emission wavelength range. This is to allow broad bandwidth of the emitted radiation and thus support short laser pulses. For example, the use of solid states based (e.g. suitably doped semiconductor or crystal) gain media may be preferred for operation of the laser system in a pulsed mode. This is as a result of the relatively wide bandwidth of emission that may be used to provide shorter (e.g. mode-lock) pulses.

Figure 4:
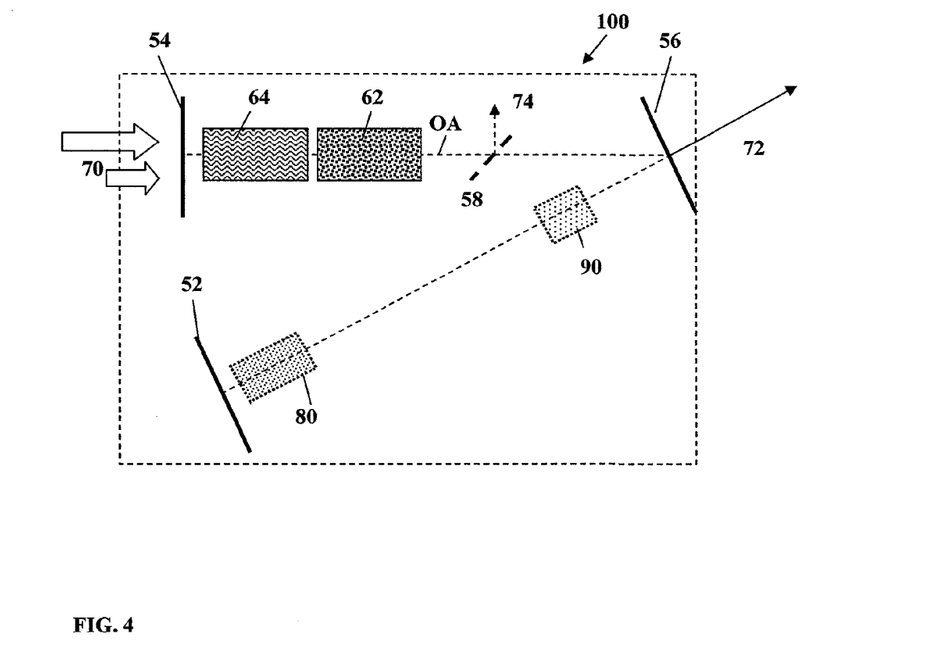
FIG. 4 illustrates a laser system according to some embodiments of the present invention, having an optical cavity configured in a V or Z shape.

Additional configuration is exemplified in FIG. 4; here the optical cavity 50 is configured to have a V shape (however additional shapes such as Z shape may also be used in a similar fashion). As indicated above, the optical cavity is defined by first and second at least partially reflecting surfaces 52 and 54 and includes a first and second gain media 62 and 64. Additionally, the laser system includes a wavelength conversion unit 80 and/or pulsing unit 90 as described above. In either V or Z configurations, the optical cavity includes at least one additional reflecting surface 56, which may or may not be configured as output coupler. In the example of FIG. 4, the additional reflecting surface 56 is exemplified as being an output coupler.

The output coupler is configured to transmit a portion of light impinging thereon, to thereby provide output radiation of the laser system. Additionally, according to some embodiments and as will be described in more details below, the laser system may include a loss generator 74 configured to cause desired loss to optical radiation of one or more predetermined wavelengths. The loss generator may be a dichroic mirror, as exemplified in the figure, configured to reflect light of one or more predetermined wavelength away from the optical cavity while transmit light of the desired wavelengths to propagate within the optical cavity 50. Additional configurations of the loss generator 74 may include: the use of a dichroic mirror for transmitting predetermined wavelength away from the optical cavity while reflecting light of the desired wavelength into the optical cavity, this is more suitable for use in Z shaped optical cavity but may also be implemented where one of the reflecting surfaces (preferably the second 54, being a back reflector or front reflector 52 or additional surface not specifically shown) is configured with low reflection for the undesired wavelengths. Additionally or alternatively one or more absorbers may be used, or a grating configured to direct light of the undesired wavelength away from the optical cavity to cause suitable loss.

It should be noted that the use of loss generator 74 may be beneficial in the laser system of the present invention as described herein regardless of the system's configuration and is thus not limited to a folded (V-shaped or Z-shaped) configuration. Thus a loss generator may be used in any configuration of the laser system as described herein.

As indicated above, the laser system according to some embodiments of the present invention may utilize a multiple arms' configuration. Such two-arm configuration is exemplified in FIG. 5. As shown in the figure, the laser system 100 includes first and second reflecting surfaces 52 and 54, which are at least partially reflecting, while a beam splitting unit 92 is located within the optical cavity and configured to direct a portion of the light towards an additional at least partially reflecting surface 55. It should be noted that beam splitting unit 92 may be a beam splitter, a dichroic mirror, a prism elements, Acousto-Optical modulator (AO) or any other beam splitting element as the case may be. The laser system may also include a polarization rotator, e.g. half wavelength or quarter wavelength plate, 94. This polarization rotator may be used for selection of a suitable optical path for a specific operation of the laser system. This configuration of the laser system provides and auxiliary arm having an additional output coupler (in this non-limiting example the output coupler may be the at least partially reflecting surface 55, however additional output coupler may be used including closed cavity having almost full reflection from all reflecting surfaces thereof). It should be noted, although not specifically shown in FIG. 5, that the double-arm laser system 100 may be configured with a single gain medium, while providing at least two different operation modes via the main and auxiliary arms. Such operation modes may be different spatial modes (e.g. $TEM_{11}$ vs. $TEM_{00}$ or any other variation thereof), different temporal modes (e.g. pulsed laser vs. CW, or pulsed lasing in different frequencies) and/or different wavelength ranges.

Figure 5:
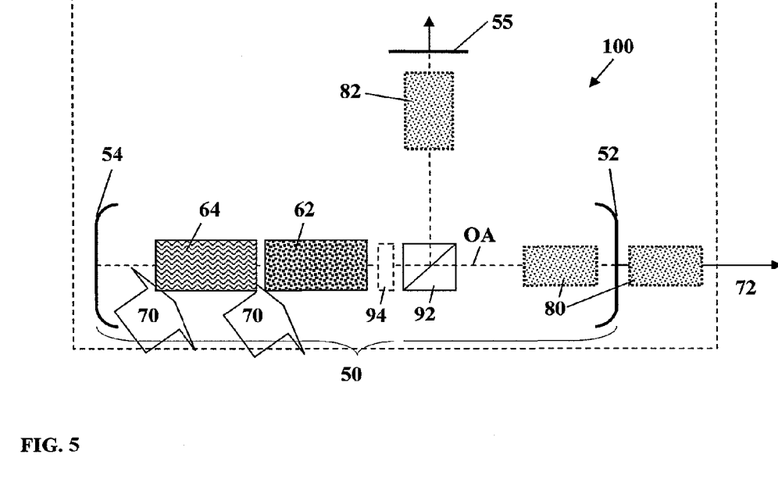
FIG. 5 illustrates a laser system according to some embodiments of the invention utilizing an auxiliary arm and providing an additional output mode.

The beam splitting unit 92 may be a polarization beam splitter or any other type of path selection module such as prism, grating, revolving mirror, polarization beam splitter, dichroic mirror, AO modulator. Generally, the beam splitting unit may allow selective transmission of optical radiation towards the main or auxiliary arm. In some configurations, the beam splitting unit 92 may include a wavelength filter configured to allow selection of wavelength ranges to be emitted through the auxiliary arm or the main arm. For example, the laser system may be configured to emit optical radiation of a selected third wavelength (using a wavelength conversion unit) from the output coupler of the main arm (main coupler) while selectively emitting optical radiation of one or both of the first and second wavelengths from the coupler of the auxiliary arm (auxiliary coupler). For example, according to some embodiments the laser system may be configured to emit, from its one (e.g. main) arm optical radiation at wavelengths of 1030 nm and 1319 nm while operating one other arm (e.g. auxiliary) at wavelengths of 1030 nm and 1338 nm. Alternatively, the laser system may be configured to direct optical radiation at wavelength of selected wavelength to the auxiliary arm and thus allow efficient emission in other selected wavelengths.

According to the present invention, the main and auxiliary arms of the laser system may be configured to provide optical emission of different properties. The laser system shown in FIG. 5 includes a mode selection unit 82 located within the optical cavity of the auxiliary arm of the laser system. The mode selection unit 82 may be configured to allow generation of one or more desired operation modes of radiation in one or more selected wavelengths. This allows selection of optical radiation of a first operation mode to be emitted from the main arm while emitting optical radiation of a different operation mode or wavelengths from the output coupler of the auxiliary arm.

Alternatively or additionally, the mode selection unit may include a pulsing unit, such as a Q-switch mechanism, configured to cause optical emission to be pulsating when being output from the auxiliary arm. For example, the laser system 100 may be configured to provide continuous optical emission of the third wavelength (using the wavelength conversion unit 80) through the main coupler while providing pulsed optical emission of the first or/and second wavelength or/and the third wavelength through the auxiliary coupler using a suitable Q-switch mechanism. It should be noted that the beam selection elements, beam splitting unit 92 with or without polarization rotator 94 may be configured to selectively transmit optical radiation of specific wavelengths towards the main or auxiliary arms, such selection may be based on polarization and/or wavelength. Also the selection may be made by an operator using the laser system 100 at certain time for pulsed radiation and at certain times for continuous radiation.

Suitable selection of radiation components directed to the main or auxiliary arms of the laser system may be provided using a polarization selector 94 located in any desired location of the optical cavity, and it may be located between the gain media 62 and 64, or at any side of the gain media, or between the gain unit and the beam splitting unit 92. The polarization selector may be a half- or quarter-wave plate configured with respect to one of the first, second or third wavelength in accordance with the desired wavelength of emission from the auxiliary coupler. Additionally or alternatively the polarization selector 94 may be a pockel cell configured to selectively affect polarization of light passing through in accordance with electrical voltage applied on the cell.

It should also be noted that selective operation of the laser system through the main and/or auxiliary arms may be provided by physical blocking of light passage to either one of the arms. Additionally or alternatively the polarization selector may be provided by an opto-electronic device configured to selectively vary polarization state/orientation of input light in accordance with supplied external power/voltage. This may allow the laser system 100 to operate as a laser (cavity) with respect to optical emission of one or more wavelength through the main coupler while operating as an amplifier (no laser cavity) with respect to one or more other selected wavelength through the auxiliary arm.

Figure 6:
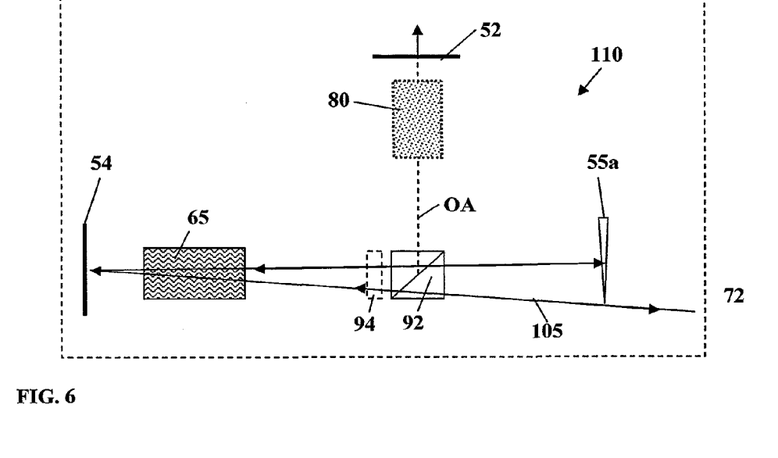
FIG. 6 illustrates a double arm laser system according to some embodiments of the present invention.

In this connection, reference is made to FIG. 6 illustrating a laser/amplifier system 110 according to some embodiments of the present invention. In this configuration, a single gain system 65, including one or more gain media is used to selectively emit optical radiation within a lasing optical cavity (defined by the first and second at least partially reflecting elements 52 and 54, shown with a bent optical path, or as a ring shaped cavity) and/or amplify intensity of input optical radiation 105. Selection between laser operation and amplifier operation may be given by beam splitting unit 92, used along or in combination with a polarization rotator 94.

The system 110 provides a path for optical amplification of input light 105 for a single, double, triple, quadruple or generally multiple passes through the gain system 65 thus amplifying the input optical radiation 105 utilizing stimulated emission from the gain unit 65. It should be noted, and as indicated above, that a double arm laser system and/or laser/amplifier system according to the present invention may operate with a one or more gain media, and generally suitable to operate utilizing a single gain medium.

As exemplified in the figure, in order to control the trajectory of input beam 105 through the gain system 65 laser/amplifier system 110 utilizes a reflecting prism 55a (which may be replaced with suitable grating or any other reflective elements configured at an appropriate angle to direct the beam in the desire optical path) configured to direct the light beam is a slightly shifted angle (not shown) back towards the gain medium 64. Orientation of the reflecting prism 55a is configured such that light beam passes through the gain medium at least twice, preferably four and at times higher number of times, before it is output of the amplifier. It should be noted that FIG. 6 illustrates the amplified optical radiation to be output of the amplifier along a similar path as the input radiation 105. However, it should be noted that the system is preferably configured to vary the output path with respect to the input path in order to simplify further manipulation of the amplified beam.

Generally, according to some embodiments, the laser system 100 or 110 according to the present invention utilizes a gain system 65 including one or more gain media (first and second gain media 62 and 64 are exemplified herein) formed by appropriately dopes crystal structures, for example, the first and second gain media may be one or two elements of yttrium aluminum garnet (YAG) crystals respectively doped with appropriate amounts of Neodymium (Nd) and Ytterbium (Yb) or any other solid host for the selected gain doping. Generally, a single YAG crystal may be doped in two regions thereof with Nd and Yb ions, or two separate YAG crystals, respectively doped with Nd and Yb ions. Additionally, as indicated above, the first and second gain media may be in the form of a single crystal doped with two gain materials in the same or different densities along the same crystal or ceramic crystal.

Thus, the laser system 100 according to some embodiments may utilize a Nd:YAG/Yb:YAG gain configuration. Such selection of gain material may be best operated utilizing optical pumping. For example, the optical pumping may be within a single wavelength range, or include optical pumping in two or more wavelength ranges. According to one example, the optical pumping may include optical radiation of at least one of 808 nm and 940 nm. In such pumping configuration, radiation at 808 nm provides efficient excitation of the Nd gain ions while radiation at 940 nm provides efficient excitation of the Yb gain ions. Such optical pumping is configured to cause the first and second gain media to emit light of characteristic wavelengths. Generally, Nd:YAG may emit mostly at central wavelengths of about 946 nm, 1064 nm, 1123 nm and 1319 nm 1338 nm (while it may emit at additional wavelengths); while Yb:YAG may emit mostly as central wavelengths of about 1030 nm (or 1029 nm) and 1050 nm (while additional it may emit at additional wavelengths). In this connection the term about when used with respect to wavelength of emission of certain materials is used to describe standard variations of the emission wavelengths that may result from temperature, pressure or other environment variations. More specifically, the term about refers to wavelength variation of ±2 nm around the specified wavelength. Selection of wavelength may be provided by introducing loss to selected wavelengths. Such loss may be provided as indicated above by utilizing a loss generator 74, e.g. a dichroic mirror configured to reflect radiation of selected one or more wavelengths away from the optical cavity. It should be noted that the wavelength that is directed away from the optical cavity may be directed to an auxiliary arm of the laser system to provide additional radiation output coupler. Additionally or alternatively, one or both of the first and second reflecting elements/surfaces 52 and 54 may be configured to absorb, deflect or transmit light of the undesired wavelength while reflect light of the desired wavelengths.

Reducing emission of the Nd:YAG gain medium (e.g. the first gain medium 62), while pumping both the first and second gain media 62 and 64 at appropriate optical pumping, operates the laser system and provides oscillations of optical radiation at wavelength ranges having central wavelengths of 1030 nm and 1319 nm/1338 nm. In this example, the wavelength conversion unit 80 may be a Quasi Phase Matching (QPM) nonlinear crystal configured to provide sum wavelength mixing of the first and second wavelength ranges. Thus, the QPM generated optical radiation at central wavelength of:

$$\lambda_1^{-1} + \lambda_2^{-1} = \lambda_3^{-1} \quad \text{(equation 1)}$$

such that $1029^{-1} + 1319^{-1} = 578^{-1}$, $(1029^{-1} + 1338^{-1} = 582^{-1})$ thereby providing optical radiation at 578 nm or 582 nm. In this connection it should be noted that laser radiation of wavelength of 578 nm 582 nm (yellow) may be high desirable for various applications including medical and aesthetic application.

It should also be noted, and is indicated above, that for improved heat removal and thermal distribution between the first and second gain media. The laser system 100 may utilize a single gain element (e.g. a single YAG crystal) doped with both the first and second gain materials (e.g. with Nd and Yb ions). Alternatively, the first and second gain media may be two separate crystals being attached at an interface thereof by diffusion bonding provide sufficient heat transfer between the gain media. In some other configurations, the separate crystals may be located at close vicinity to each other while not being bonded between them.

Thus, the laser system 100 or 110 as described above is configured to provide laser and/or optical amplifier operation including two or more different emission modes. The system includes a gain system including one or more gain media and one or more arms of the optical cavity configured to optimize optical emission in desired wavelength and/or more of operation. Those skilled in the art will readily appreciate that various modifications and changes can be applied to the embodiments of the invention as here in before described without departing from its scope defined in and by the appended claims.

The invention claimed is:

1. A laser system, comprising:
   an optical cavity defined by at least first and second at least partially reflecting elements;
   a gain system including at least first and second gain media doped with different gain materials located within the optical cavity, the first and second gain media configured to generate optical radiation of at least first and second different wavelength ranges in response to pumping energy; and
   at least one wavelength conversion unit configured for generating nonlinear interaction of light components of the at least first or and second wavelength ranges to thereby generate light of at least a third wavelength range.

2. The laser system of claim 1, wherein the wavelength conversion unit includes an intra-cavity conversion unit or an extra-cavity conversion unit.

3. The laser system of claim 1, wherein the wavelength conversion unit is configured to provide nonlinear wavelength conversion in response to optical radiation of the at least first or and second wavelength ranges, the nonlinear wavelength conversion including at least one of the following: wave mixing, sum wavelength mixing, difference wavelength mixing, three-wave mixing, four wavelength mixing, high order wavelength mixing, optical parametric oscillator (OPO), intra-cavity OPO (IOPO), or optical parametric amplifier (OPA).

4. The laser system of claim 1, wherein the wavelength conversion unit is configured to provide nonlinear Raman wavelength conversion in response to optical radiation of the at least first and/or second wavelength ranges.

5. The laser system of claim 1, wherein the at least first and second gain media are in the form of solid material including gain material, the first and second gain media having at least one of the following configurations: the at least first and second gain media are in the form of first and second doping material of a single solid material; the at least first and second gain media are in the form of first and second element fused together at an interface thereof.

6. The laser system of claim 1, wherein the at least first and second gain media are in the form of first and second solid elements fused together by diffusion bonding at an interface thereof.

7. The laser system of claim 1, wherein the at least first and second gain media are in the form of first and second optical fibers being spliced together.

8. The laser system of claim 1, wherein the at least first and second gain media are arranged in a single gain element having at least one of: particles of the first and second gain media are mixed together within a region of the gain element; or a first region of the gain element being doped the first gain medium and a second region thereof doped with a second gain medium.

9. The laser system of claim 1, wherein the pumping energy includes at least one of optical pumping of at least one wavelength range or electrical pumping of the at least first and second gain media.

10. The laser system of claim 1, further comprising at least one intra-cavity output coupler configured to allow at least a portion of light impinging thereon to be transmitted out of the optical cavity.

11. The laser system of claim 1, wherein the optical cavity is configured in a bended form providing a V-shaped optical cavity or a Z-shaped optical cavity.

12. The laser system of claim 1, configured to provide continuous or pulsed wave radiation in at least a third wavelength range.

13. The laser system of claim 1, further comprising at least one of: a Q-switch mechanism or a mode-lock mechanism, being located within the optical cavity and configured to generate pulsed radiation in a third wavelength range.

14. The laser system of claim 1, further comprising an intra-cavity beam splitting unit and a third at least partially reflective element, the intra-cavity beam splitting unit is configured to direct at least a portion of emitted light towards the third at least partially reflective element, thereby generating an auxiliary arm of the optical cavity to thereby provide an auxiliary output coupler.

15. The laser system of claim 14, wherein the auxiliary arm of the optical cavity includes at least one of a pulsating mechanism configured to generate pulsed optical radiation of a selected wavelength ranges; or an auxiliary wavelength conversion unit configured for generating of at least a fourth wavelength in response to optical radiation of at least one of the first and second wavelength.

16. The laser system of claim 14, wherein the auxiliary arm is configured to provide optical emission of a selected operation mode different with respect to operation mode of optical radiation emitted by an output coupler of a main arm of the optical cavity, the selected operation mode defined by at least one of the following: temporal mode, spatial mode, or wavelength range.

17. The laser system of claim 1, wherein the first gain medium includes Neodymium and the second gain medium includes Ytterbium, the pumping energy being provided by optical radiation.

18. The laser system of claim 1, wherein at least one of the first or second at least partially reflecting elements is configured with dielectric coating to reduce reflection of optical radiation in one or more selected wavelengths, while maintaining reflection properties for optical radiation in one or more other selected wavelengths.

19. The laser system of claim 1, wherein the laser system is configured to provide output radiation of a third wavelength range, the third wavelength range comprises a wavelength of 578 nm or 582 nm.

20. The laser system of claim 1, wherein said first and second gain media comprises first and second different rare earth ions embedded in a similar crystal carrier.

21. The laser system of claim 1, wherein said first and second gain media being selectively operated by said pumping energy to selectively provide optical radiation of the at least first and second different wavelength ranges.

22. The laser system of claim 1, wherein said first and second different wavelength ranges differ between them by at least 10 nm.

* * * * *